US006412287B1

(12) United States Patent
Hughes et al.

(10) Patent No.: US 6,412,287 B1
(45) Date of Patent: Jul. 2, 2002

(54) HEATED/COOLED CONSOLE STORAGE UNIT AND METHOD

(75) Inventors: Eric C. Hughes, Clayton; Richard Allen Merrifield, Spring Valley, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/747,285

(22) Filed: Dec. 21, 2000

(51) Int. Cl.[7] ............................................... F25D 21/02
(52) U.S. Cl. ............................ 62/3.61; 62/3.2; 62/244
(58) Field of Search ............................ 2/3.2, 3.6, 3.61, 2/3.62, 3.7, 244, 243, 158, 153

(56) References Cited

U.S. PATENT DOCUMENTS 4,823,554 A * 4/1989 Trachtenberg et al. ........ 62/3.2
5,282,364 A * 2/1994 Cech ............................. 62/3.2
5,720,171 A * 2/1998 Osterhoff et al. ............. 62/3.6
5,970,719 A * 10/1999 Merritt .......................... 62/3.6

FOREIGN PATENT DOCUMENTS

JP          2-85683    *  2/1990  ................... 62/3.2

* cited by examiner

Primary Examiner—Denise L. Esquivel
Assistant Examiner—Melvin Jones
(74) Attorney, Agent, or Firm—Kathryn A. Marra (57) ABSTRACT

A storage unit is provided for selectively heating and/or cooling items placed therein. The storage unit has a first storage compartment and a second storage compartment. A thermoelectric module is positioned in between the first and second storage compartments. The thermoelectric module regulates and maintains various desired temperatures within the storage compartments. Particularly, the thermoelectric module is capable of heating the first storage compartment and cooling the second storage compartment.

20 Claims, 8 Drawing Sheets

HEATED/COOLED CONSOLE STORAGE UNIT AND METHOD

TECHNICAL FIELD

The present invention relates generally to a temperature controlled storage unit for use in vehicle.

BACKGROUND OF THE INVENTION

As reliance upon motor vehicles increases, so does the demand for occupant functionality and comfort. In many motor vehicle applications, it is desired by an occupant of the vehicle to transport food and/or beverage items. Such items are typically stored in an occupant compartment located within the vehicle to provide the occupant with convenient access to the food and/or beverages. Often, the food and/or beverage items are placed on a non-occupied seat or upon the floor within the occupant compartment or, alternatively, upon fixtures located within the compartment such as a dashboard, or center console, etc. Some vehicles include containers for securing such items. Additionally, containers may be brought into the vehicle to hold certain food and/or beverage items.

However, the original thermal condition of food and/or beverage items stored as described in motor vehicles rapidly deteriorates toward the ambient temperature of the vehicle interior, i.e., heated foods and beverages tend to cool while those originally cooled increase in temperature. This tendency has several negative consequences. First, palatability of the respective food and/or beverage degrades as the original thermal conditions are lost. Second, exposed foods and beverages in a vehicle occupant compartment are subject to spillage and thus threaten the integrity of the compartment features, such as upholstery, electrical components, etc. Additionally, bearing in mind that vehicle interior temperatures may easily reach 120° F., spoilage of certain foods and/or beverages, such as milk for example, is of concern to those vehicle operators transporting such items.

Accordingly, it is desirable to have a convenient storage compartment within a motor vehicle that provides both heating and cooling capabilities for a variety of food and beverage items.

SUMMARY OF THE INVENTION

According to the present invention, a storage unit is provided for selectively heating and/or cooling items placed therein. The storage unit has a first storage compartment and a second storage compartment. A thermoelectric module is positioned in between the first and second storage compartments. The thermoelectric module regulates and maintains various desired temperature within the storage compartments. Particularly, the thermoelectric module is capable of heating the first storage compartment and cooling the second storage compartment. However, the thermoelectric module may be operated to cool the first storage compartment and heat the second storage compartment.

BRIEF DESCRIPTION OF THE DRAWINGS

The present invention will now be described, by way of example only, with reference to the accompanying drawings in which.

DESCRIPTION OF THE PREFERRED EMBODIMENT

FIGS. 1–4 illustrate a heated/cooled console storage unit 10. Storage unit 10 generally includes a storage compartment 12 and a storage compartment 14. Storage compartment 12 and storage compartment 14 are positioned so that one wall of each compartment is located adjacent to one another. A thermoelectric module 16 is disposed intermediate to the adjacent walls of storage compartment 12 and storage compartment 14.

Storage compartment 12 is positioned to be heated by thermoelectric module 16. With reference to FIGS. 1–4, storage compartment 12 is a rectilinear solid having an exterior compartment wall 18 which forms a compartment interior 20. Exterior compartment wall 18 includes an access opening 22 formed therein.

A lid 24 is hingably attached at the access opening 22 to exterior compartment wall 18. Lid 24 may be moved into an open position about the hinge connection thus exposing compartment interior 20. Alternatively, lid 24 may be placed in a closed position thereby closing storage compartment 12. A seal member 26 is disposed between exterior compartment wall 18 and lid 24 such that when lid 24 is placed in the closed position, seal member 26 provides for an airtight mating of lid 24 with exterior compartment wall 18. Seal member 26 may be fixed to compartment wall 18 or to lid 24. Seal member 26 may alternatively include a plurality of seal members, fixed to both wall 18 and lid 24, depending upon the respective use and function required thereof.

Figure 5:
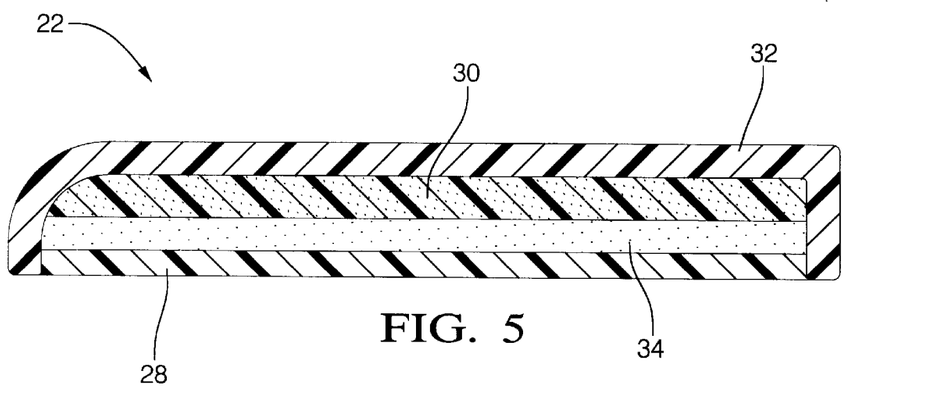
FIG. 5 is a cross-sectional view of the lid of FIG. 4 along an axis A—A.

Lid 24 is contoured and treated as desired for exposure to a user. For example, as shown in FIG. 5, lid 24 may include a rigid substrate 28, a foam cladded layer 30 formed upon the substrate, and a decorative skin 32 formed upon the cladded layer. Further, the lid may include a lid insulation layer 34 to preserve the thermal integrity of storage compartment 12.

Referring again to FIGS. 1–3, storage compartment 12 further includes a compartment insulation layer 36 formed integrally upon exterior compartment wall 18. In an exemplary embodiment, insulation layer 36 extends from seal member 26 about the entire exterior compartment wall opposite compartment interior 20.

Exterior compartment wall 18 is made of any material suitable for containing items to be placed within storage compartment 12, such as food and/or beverage items. For example, exterior compartment wall 18 may be composed of molded plastic or formed of aluminum. Compartment insulation layer 36 is made of any material suitable for thermally insulating interior 20 of storage compartment 12, such as, for example, foam insulation.

Storage compartment 12 is constructed in a plurality of sizes depending upon a particular application. In one embodiment, the compartment includes 130 in.$^3$ of storage space within compartment interior 20. Of course, different interior dimensions and sizes are contemplated for use with the present invention.

It will be understood that storage compartment 12 has been described as having a rectilinear form by way of example only. An alternative embodiment of the present invention includes the compartment having a curvilinear shape or being formed of a combination of curvilinear and rectilinear shapes as is necessitated by a particular application of storage compartment 12.

As mentioned herein above and shown in FIGS. 1 and 2, heated/cooled console storage unit 10 includes storage compartment 14 disposed preferably adjacent to storage compartment 12. Storage compartment 14 is similarly constructed to storage compartment 12 in that compartment 14 is generally formed as a rectilinear solid having an exterior compartment wall 38 which defines a compartment interior 40 formed therein.

Compartment interior 40 is of any dimension suitable for the desired purposes of storage compartment 14. For example, compartment interior 40 may be 260 in.$^3$. Or, more simply, storage compartment 14 may have twice the dimension of interior 20 of storage compartment 12. Of course, different interior dimensions and sizes are contemplated for use with the present invention.

Figure 6:
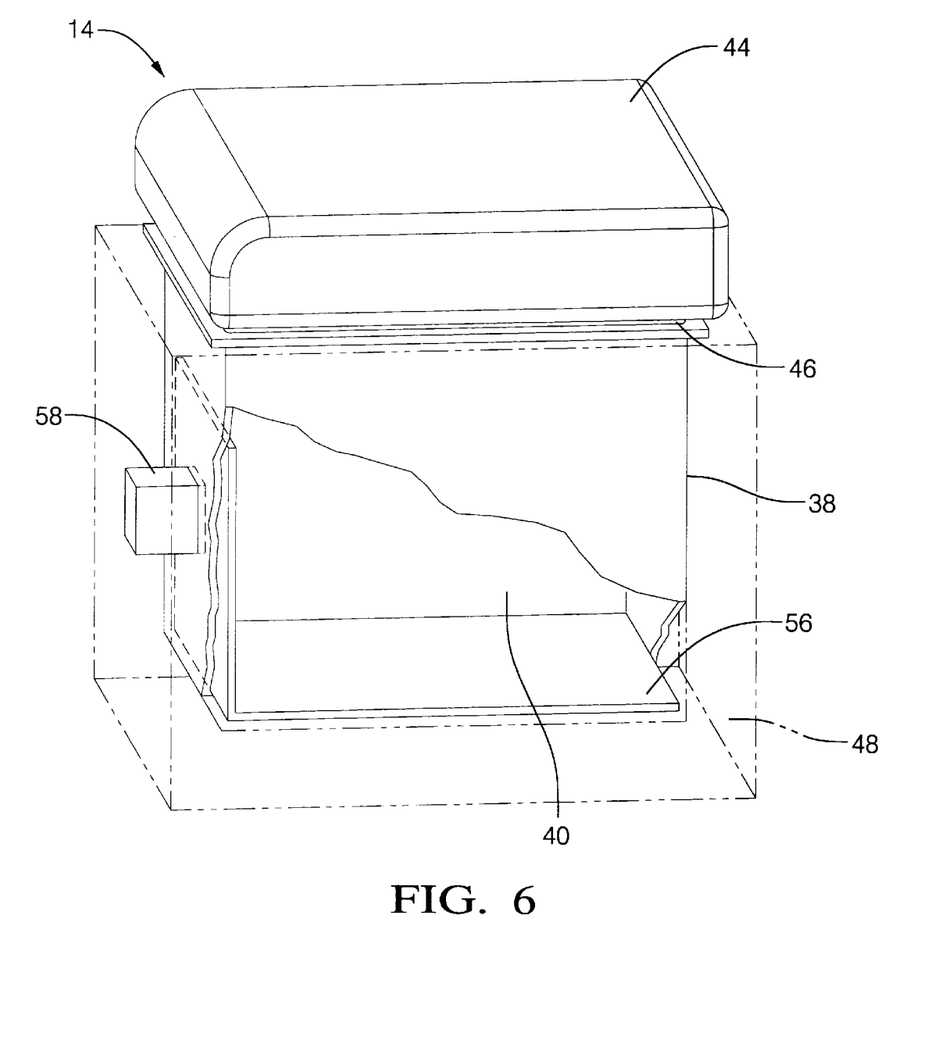
FIG. 6 is an enlarged view of a cold storage compartment of the heated/cooled console storage unit of FIG. 1.
Figure 7:
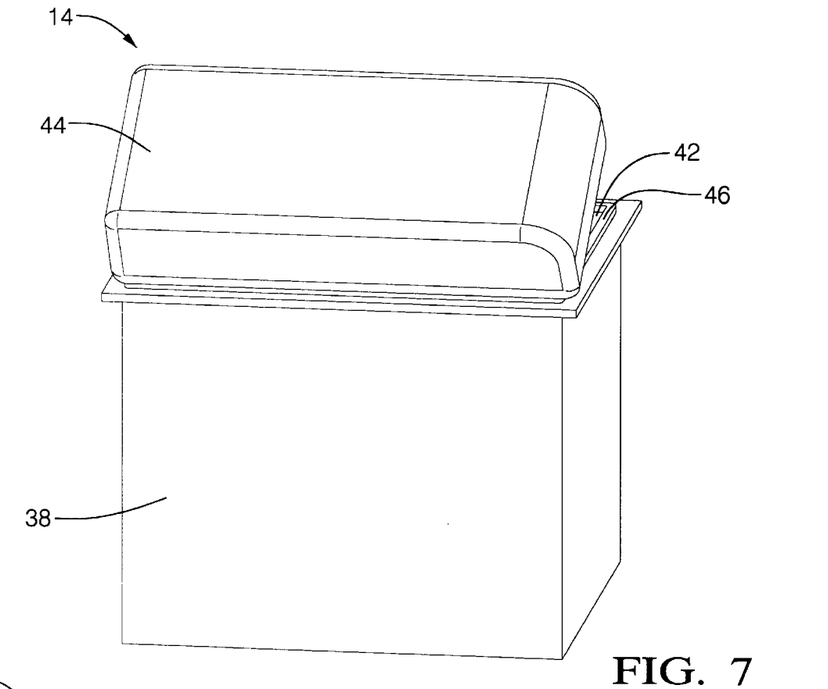
FIG. 7 is a perspective view of the cold storage compartment of FIG. 6 having a lid in an open position.

Exterior wall 38 of compartment 14 has an access opening 42 formed therein at which a lid 44 is hingably attached to the wall, as shown in FIGS. 6 and 7. Lid 44 is identical to lid 22 of storage compartment 12 in cross-section and includes substrate 28, foam cladded layer 30, decorative skin 32, and insulation layer 34, as shown in FIG. 5. However, lids 22, 44 are sized according to the access openings of their respective storage compartments 12, 14 and, thus, lid 44 is generally larger in surface area then lid 22.

A seal member 46 is disposed between lid 44 and exterior compartment wall 38 for providing a thermal seal between the lid and the wall. Lid 44 may be placed in an open position (FIG. 7) or a closed position (FIGS. 1, 2, 6) about the hinge connection allowing access to compartment interior 40 or denying access thereto.

Finally, storage compartment 14 includes an insulating layer 48 formed integrally upon exterior compartment wall 38. Exterior compartment wall 38 and insulating layer 48 of storage compartment 14 are generally composed of the same materials as wall 18 and insulating layer 36 of compartment 12, respectively. That is, compartment wall 38 and layer 48 are composed of any of a plurality of materials suitable for containing items within interior 40 at a desired temperature, particularly food and/or beverage items at a temperature lower than that of the exterior of compartment 14. For example, the exterior compartment wall may be made of molded plastic or formed of aluminum and the insulating layer may be an insulating foam material.

Storage compartments 12 and 14 are preferably arranged adjacent to one another. Insulating layers 36 and 48 may be formed integrally with one another to form a continuous layer of insulation 50 about storage compartments 12 and 14 to insulate the compartments from the surrounding ambient air temperature. Additionally, continuous insulation layer 50 may extend between storage compartment 12 and storage compartment 14 to preserve the thermal integrity therein.

Figure 8:
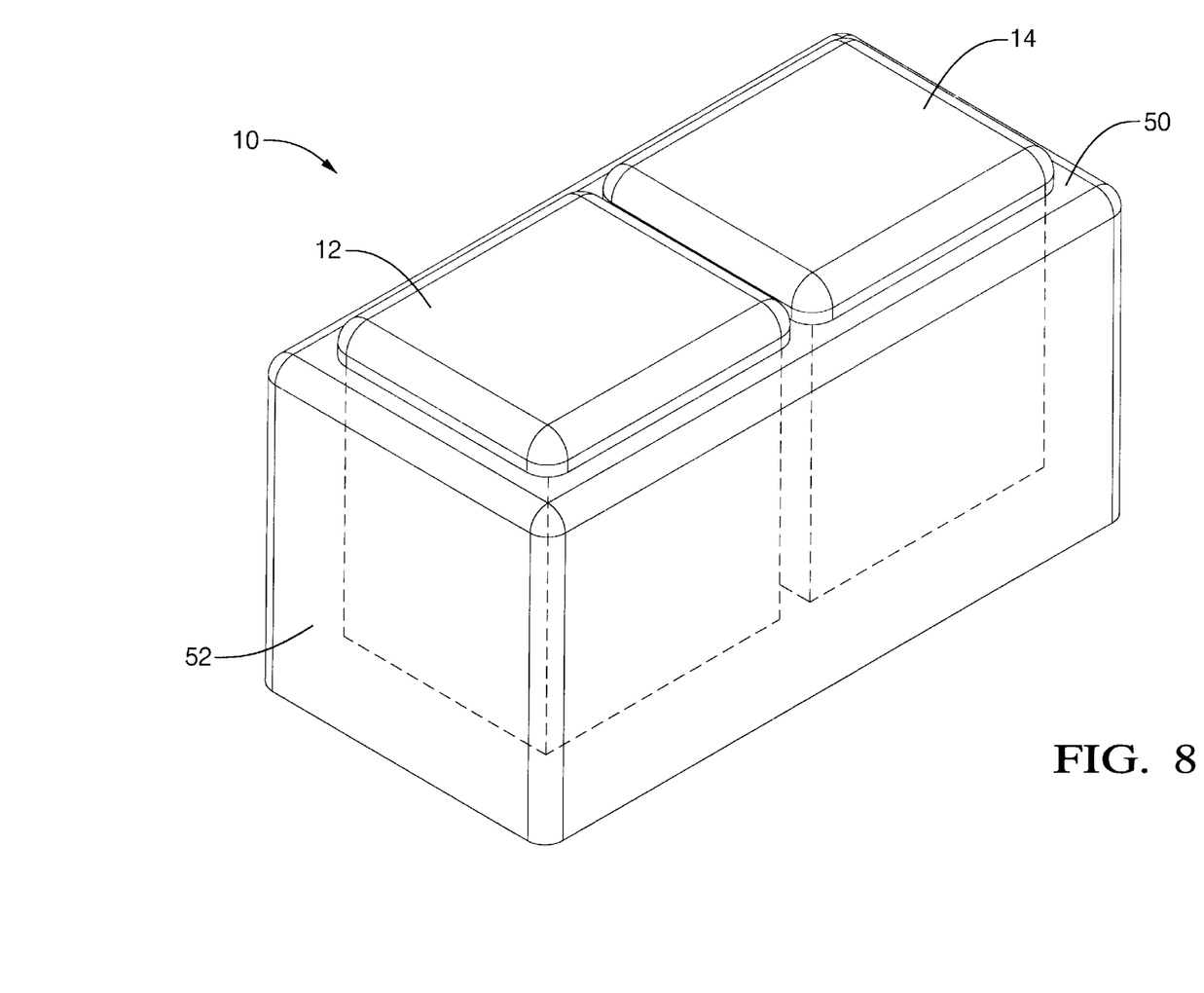
FIG. 8 is a perspective view of the heated/cooled console storage unit of FIG. 1 in another embodiment of the present invention.

In an alternative embodiment, shown in FIG. 8, heated/cooled storage console unit 10 includes a casing 52 located about continuous insulation layer 50. Casing 52, for example, is composed of a hard plastic and is adhered to continuous insulation layer 50. In this way, the casing contains heated/cooled storage unit 10, thus allowing for the disposition of the storage unit in a plurality of locations, especially throughout a motor vehicle.

Figure 1:
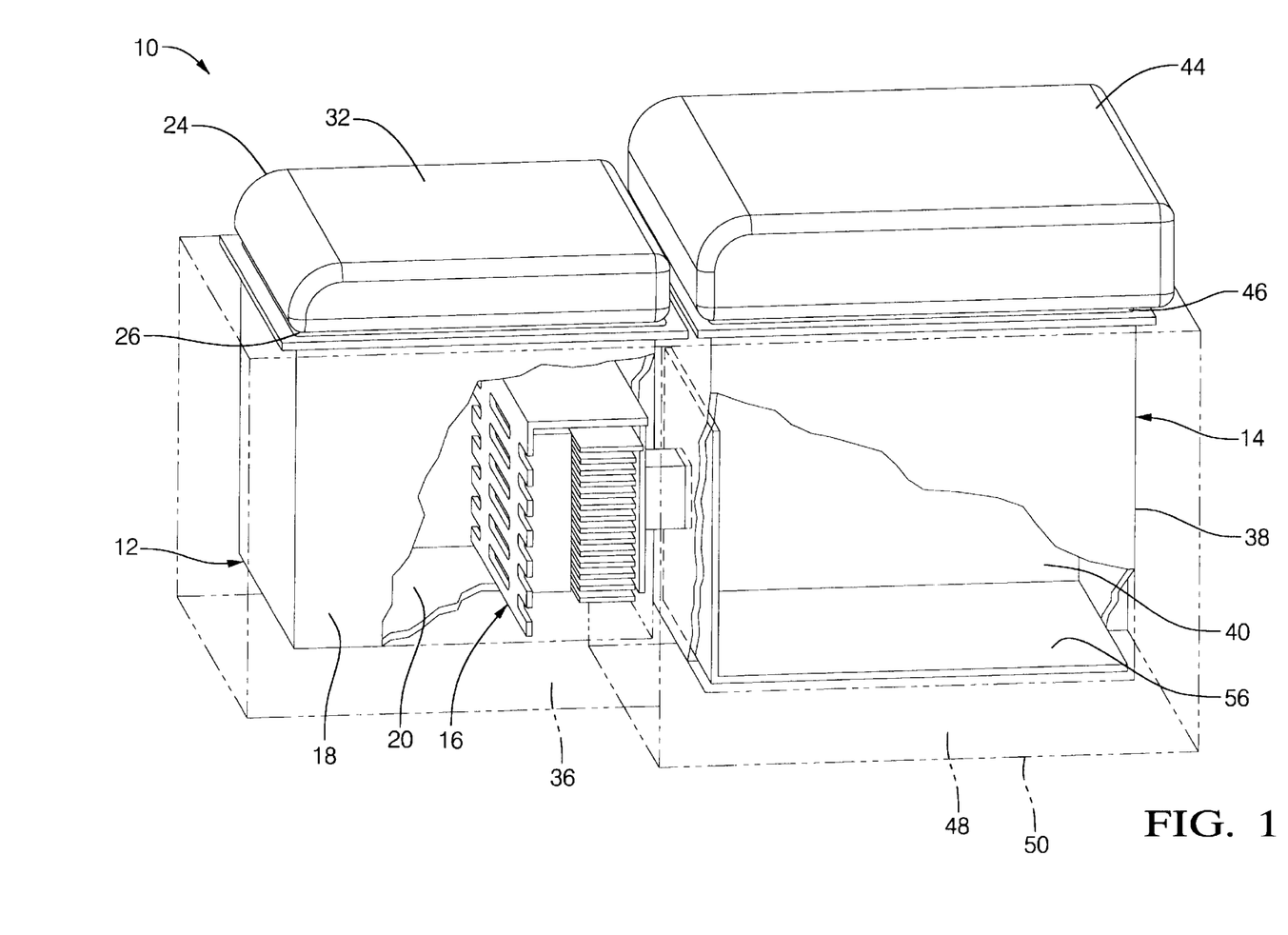
FIG. 1 is a perspective view of a heated/cooled console storage unit and in one embodiment of the present invention.
Figure 2:
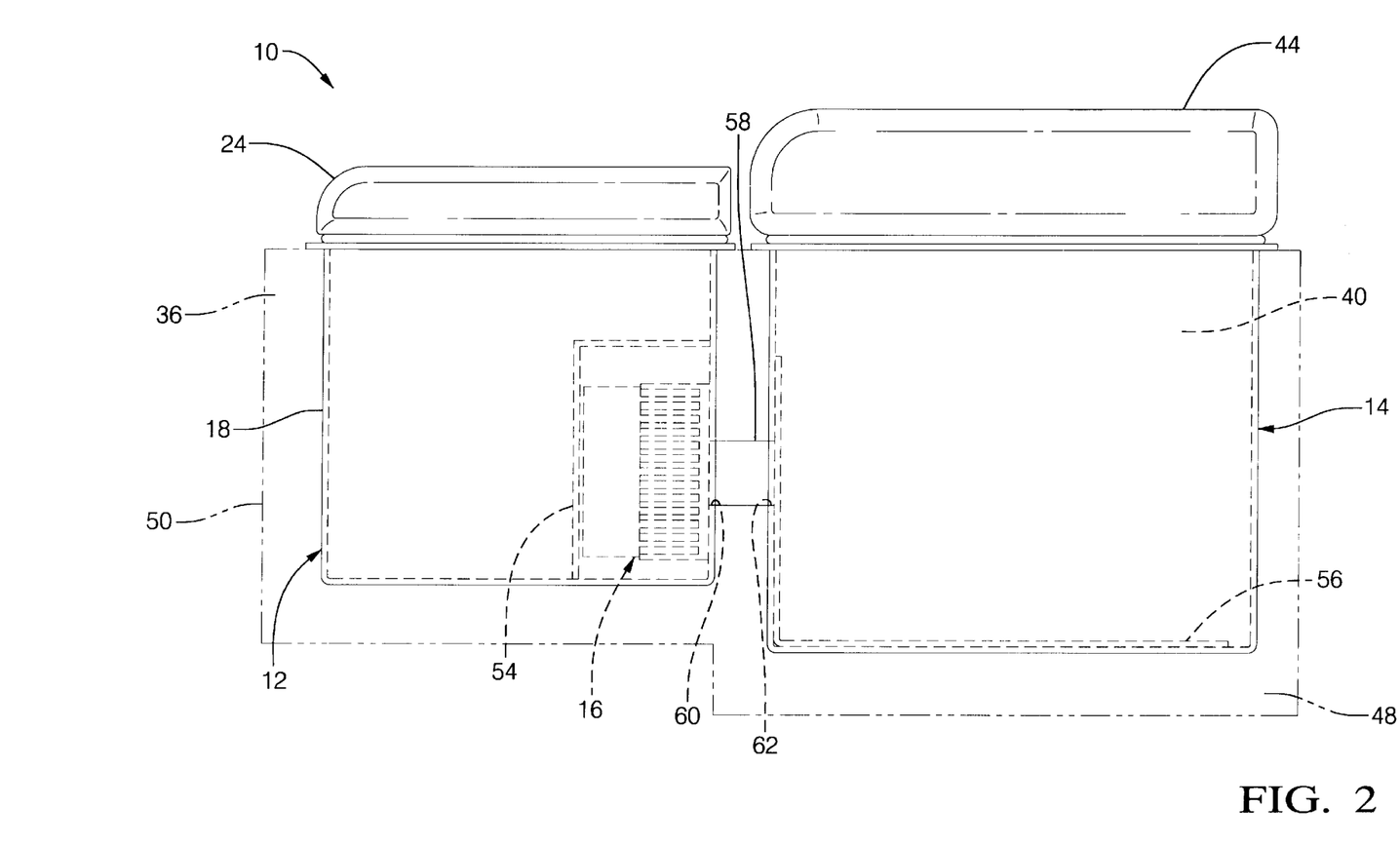
FIG. 2 is a side elevation view of the heated/cooled console storage unit of FIG. 1.

Referring to FIGS. 1 and 2, thermoelectric module 16 is disposed in between compartments 12 and 14. Thermoelectric module 16 is, in an exemplary embodiment, a dual stage module having a heat sink assembly 54 disposed at interior 20 of storage compartment 12 and a cold plate 56 located within interior 40 of storage compartment 14. A conductive element 58 is disposed between storage compartments 12 and 14 providing electric connectivity to heat sink assembly 54 and cold plate 56.

Conductive element 58 is connected at a first end to heat sink assembly 54, from which conductive element 58 extends through a first compartment opening 60 formed in storage compartment 12. At a second opposing end, conductive element 58 is connected to cold plate 56 through a second compartment opening 62 formed in storage compartment 14. Compartment openings 60 and 62 are formed so as to seal about conductive element 58 to prevent undesired migration of heat into or out of storage compartments 12 and 14. Continuous insulating layer 50 is formed between storage compartments 12, 14 and correspondingly, about conductive element 58 to further provide insulation proximate to the conductive element and the compartment openings.

Referring again to FIG. 3, heat sink assembly 54 includes a heat sink 64 preferably disposed within interior 20 of storage compartment 12 adjacent to exterior compartment wall 18. Heat sink 64 includes a plurality of fins 66 to inhibit distribution of heat to storage compartment 12. A fan mechanism 68 is disposed adjacent to heat sink 64.

Figure 3:
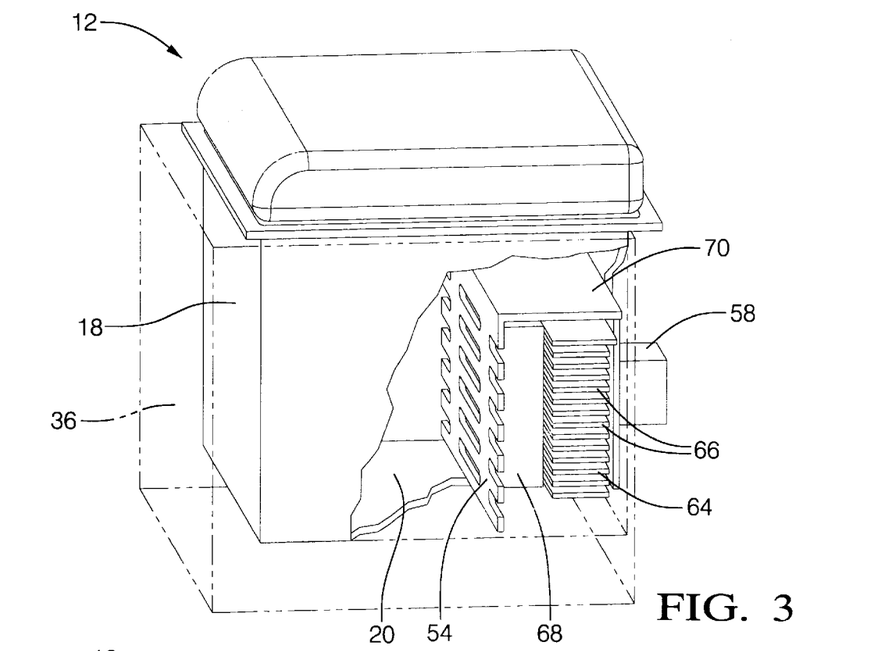
FIG. 3 is an enlarged view of a hot storage compartment of the heated/cooled console storage unit of FIG. 1.
Figure 4:
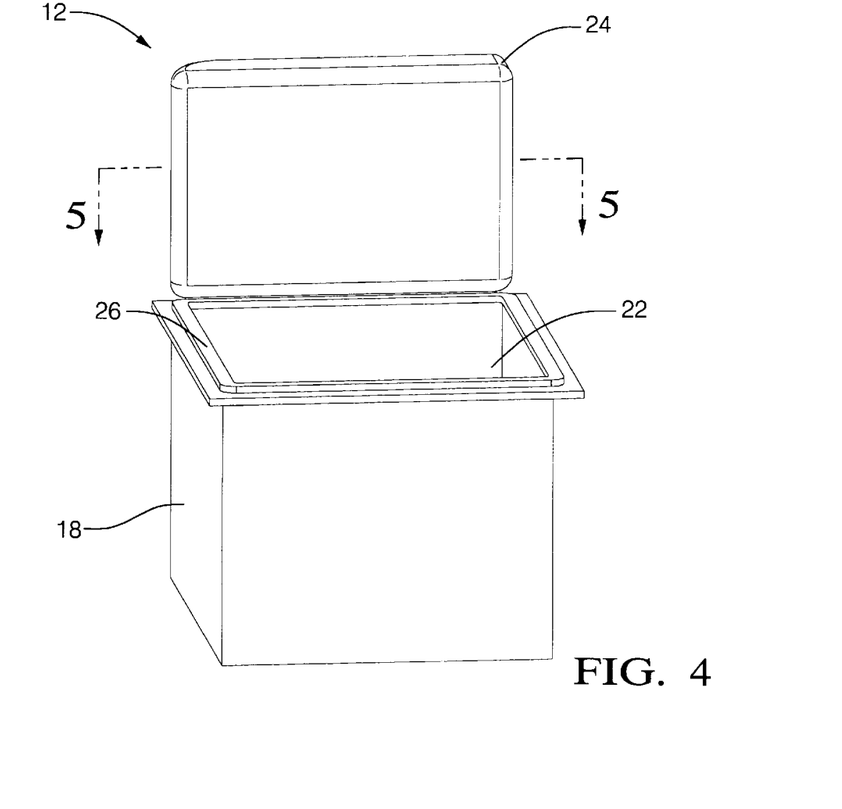
FIG. 4 is a perspective view of the hot storage compartment of FIG. 3 having a lid in an open position.

Heat sink assembly 54 further includes a cover member 70 disposed about heat sink 64 and fan mechanism 68. Cover member 70 serves to prevent direct contact of the heat sink assembly 54 by contents stowed within storage compartment 12 while still allowing for the efficient transfer of heat thereto. In general, heat sink assembly 54 may be any such apparatus suitable for use in distributing heat in a thermoelectric system.

Cold plate 56, as shown in FIGS. 1, 2, and 6, is disposed within storage compartment 14 and is connected to conductive element 58 through second compartment opening 62. Cold plate 56 is a thin element preferably made of a thermally conductive material such as a metal like aluminum. Cold plate 56 may be L-shaped and equal in width to that of the interior of storage compartment 14. Thus, cold plate 56 is located within compartment 14 flush against two surfaces of exterior compartment wall 38 and connected therein to conductive element 58 through second compartment opening 62. In this way, cold plate 56 forms a contact surface for items placed in storage compartment 14.

Figure 9:
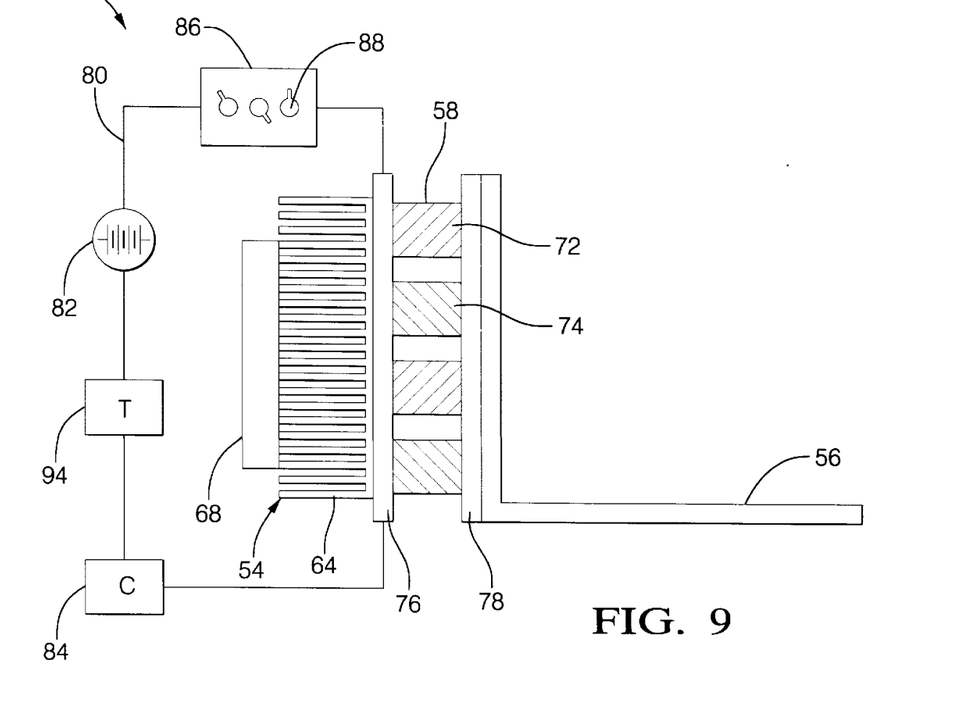
FIG. 9 is a thermoelectric module in one embodiment of the present invention.

Referring now to FIG. 9, the thermoelectric module 16 is illustrated in a simplified configuration.

Broadly, conductive element 58 consists of semiconducting materials sandwiched between electrodes. The conductive element 58 is composed of, for example, bismuth telluride materials having N-type and P-type properties, the materials being disposed connectively with electrical conductors such as copper members which, in turn, are connected to electrically insulative/thermally conductive electrode materials such as ceramics.

More specifically, conductive element 58 is a dual stage thermoelectric element and is composed of a plurality of P-type thermoelectric materials 72 and N-type thermoelectric materials 74, both arranged between a first electrode layer 76 and a second electrode layer 78. Of course, single stage and/or multiple stage thermoelectric elements may be employed in the present invention.

In an exemplary embodiment, first electrode layer 76 and second electrode layer 78 are ceramic substrates. First and second electrode layers 76 and 78 are disposed therebetween to hold the overall structure of thermoelectric module 16 together mechanically, and insulate individual P-type 72 and N-type 74 thermoelectric materials electrically from one another and from external mounting surfaces.

An electrical current from a circuit 80 is passed through first electrode layer 76 in a first direction. The arrangement of P-type 72 and N-type 74 thermoelectric material causes first electrode layer 76 to heat up while second electrode layer 78 cools as the electrical current moves back and forth alternately between first and second electrode layers 76, 78 between P-type and N-type thermoelectric materials 72, 74. As a result, first electrode layer 76 provides a heating function to heat sink 64 attached thereto and second electrode layer 78 provides a cooling function to cold plate 56 attached thereto.

A DC power source 82 generates a low voltage current through circuit 80 causing electrons to move through the P-type 72 and N-type 74 thermoelectric materials. Heat from second electrode layer 78 is pumped to first electrode layer 76 through the electron movement, and heat from first electrode layer 76 is transferred to compartment 12 by heat sink 64. Thus, as objects placed within interior 40 of storage compartment 14 come into contact with second electrode layer 78, the cooling of layer 78 causes the objects to cool. Correspondingly, objects placed within compartment 12 are heated by heat dissipated from heat sink 64.

More specifically, heat generated by first layer 76 is transferred to heat sink 64 and dissipated through fins 66 to interior 20 of storage compartment 12. Fan mechanism 68 circulates air within interior 20, readily exposing the air to fins 66, and thus facilitating distribution of heat throughout storage compartment 12.

Alternatively, thermoelectric module 16 may operate without a heat sink 64 where the generated heat from the first electrode layer 76 dissipates directly into the surrounding air within storage compartment 12.

It should be appreciated that heat sink 64 is capable of dissipating the heat generated upon first electrode layer 76 as well as heat resulting from the electrical circuit 80 and associated power supply operating mechanisms.

It will be understood that, in another embodiment of the present invention, first electrode layer 76 and heat sink 64 constitute a single integrated feature serving to both generate and dissipate heat produced by module 16. Furthermore, second electrode layer 78 and cold plate 56 may also constitute a single integrated feature for providing a cooling function to storage compartment 14.

It should be appreciated that the cooling/heating process provided by thermoelectric module 16 may be reversed by changing the polarity (plus and minus) of DC power source 82, thereby causing the electrons to move in the opposite direction, resulting in the cooling of first electrode layer 76 and heating of second electrode layer 78. Thus, storage compartment 12 may be cooled and storage compartment 14 heated by reversing the direction of circuit 80.

In the reverse process of heating second electrode layer 78, DC power source 82 generates a low voltage current in circuit 80, causing the electrons to move through N-type 74 and P-Type 72 thermoelectric materials. Due to the electron movement, heat is absorbed by first electrode layer 76 and expelled at second electrode layer 78. Correspondingly, first storage compartment 12 is cooled while second storage compartment 14 is heated.

It should also be appreciated that this reverse heating/cooling characteristic of thermoelectric module 16 allows an appropriate closed-loop temperature control circuit, or a thermister, to be utilized with heated/cooled console storage unit 10 to accurately control the temperature within storage compartments 12, 14 to better than ±0.01° C.

In one embodiment, thermoelectric module 16 operates so as to maintain a temperature of approximately 0° C. within storage compartment 12 while simultaneously providing a temperature of approximately 60° C. within the interior of storage compartment 14. Of course, other temperature variations and ratios may be provided by the thermoelectric module 16.

In a preferred embodiment, heated/cooled console storage unit 10 also includes a controller 84 to facilitate operation of the storage unit. Controller 84 regulates power supply 82 of thermoelectric module 16 and includes a thermostat mechanism with which controller 84 monitors and maintains desired temperatures within storage compartments 12, 14 by selectively activating, deactivating, or otherwise adjusting the operation of thermoelectric module 16. The controller also includes a timing mechanism (not shown) which disables the power supply to thermoelectric module 16 at a predetermined time following shut-down of the vehicle engine, thus preserving the resources of the vehicle electrical system.

Thermoelectric module 16 further includes an instrument control panel 86 which allows a user to control the operation of heated/cooled console storage unit 10. Instrument control panel 86 is communicatively connected to controller 84. Instrument control pane 86 includes one or more adjustment mechanisms 88. By selective manipulation of mechanisms 88, the user may turn on or turn off thermoelectric module 16 or otherwise vary the operation thereof, thus regulating the temperature within storage compartments 12 and 14.

Controller 84 further preferably includes a timing mechanism 94 which monitors operation of power source 82 and disables power source 82 at a predetermined time following disengagement of an engine of a vehicle in which storage unit 10 is disposed. Thus, power reserves of the vehicle are preserved.

Figure 10:
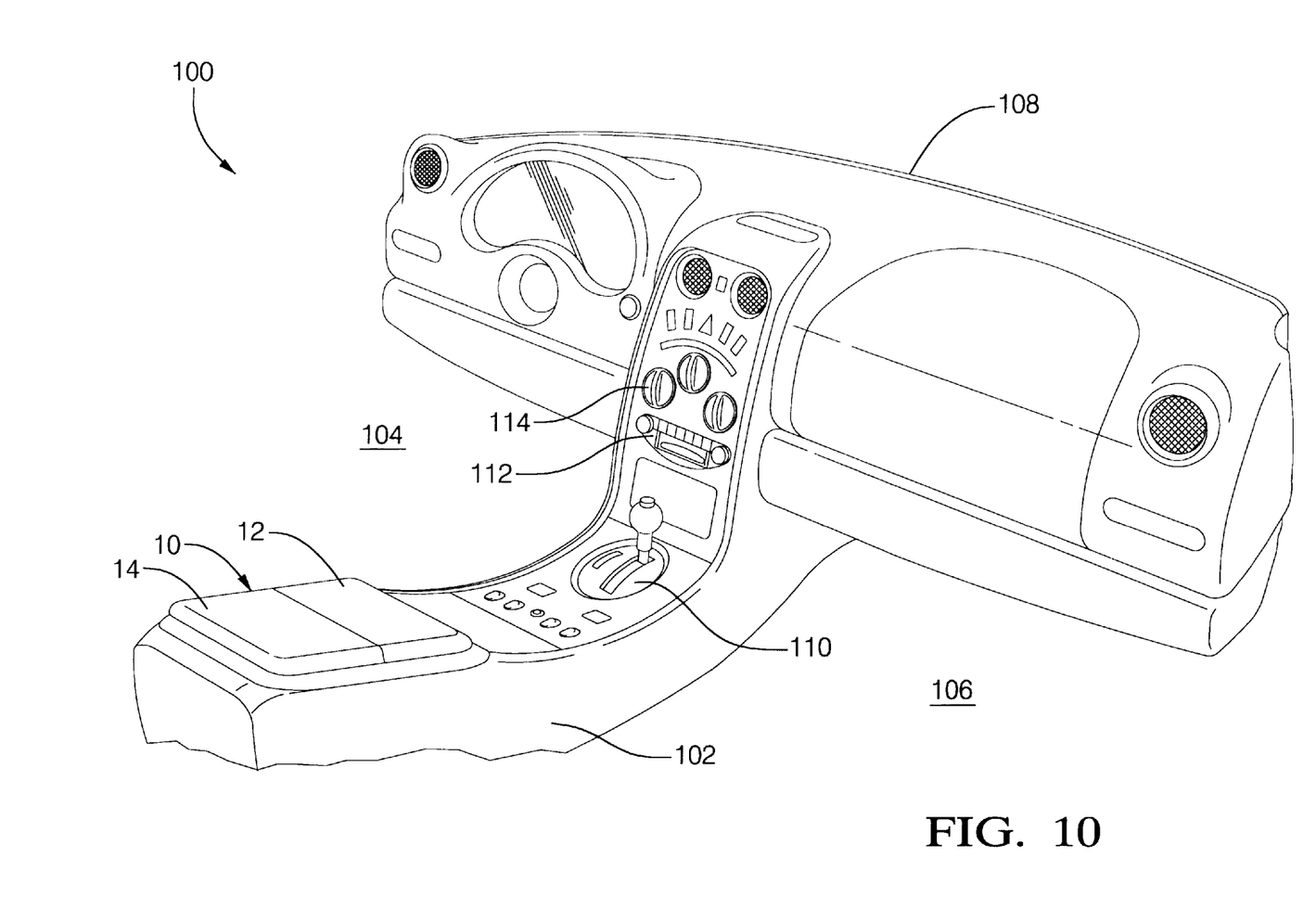
FIG. 10 is a perspective view of a vehicle occupant compartment having a heated/cooled console storage unit in one embodiment of the present invention.

Heated/cooled console storage unit 10, in one embodiment of the present invention, is located within a vehicle passenger compartment 100 as depicted in FIG. 10. Storage unit 10 is integrally formed within a center console 102. Center console 102 is located between a driver side seating area 104 and a passenger side seating area 106 and is fixed to the floor of the vehicle and to a cross-vehicle instrument panel 108. Center console 102 may include other vehicular amenities such as a transmission selector 110, an audio system controller 112, and heating, ventilation, and air conditioning controls 114.

Heated/cooled storage unit 10 is electrically connected to the electrical system of the vehicle from which storage unit 10 derives the electrical power necessary to drive thermoelectric module 16.

It will be understood that the heated/cooled console storage unit is shown in FIG. 10 as installed in center console 102 by way of example only. In an alternative embodiment, storage unit 10 may be integrally located within any of a plurality of other features of the vehicle passenger compartment such as within passenger seats, the instrument panel, the vehicle floor, or side walls of the vehicle. Furthermore, heated/cooled storage unit 10 may be located outside the occupant compartment such as in a trunk of the vehicle.

Figure 11:
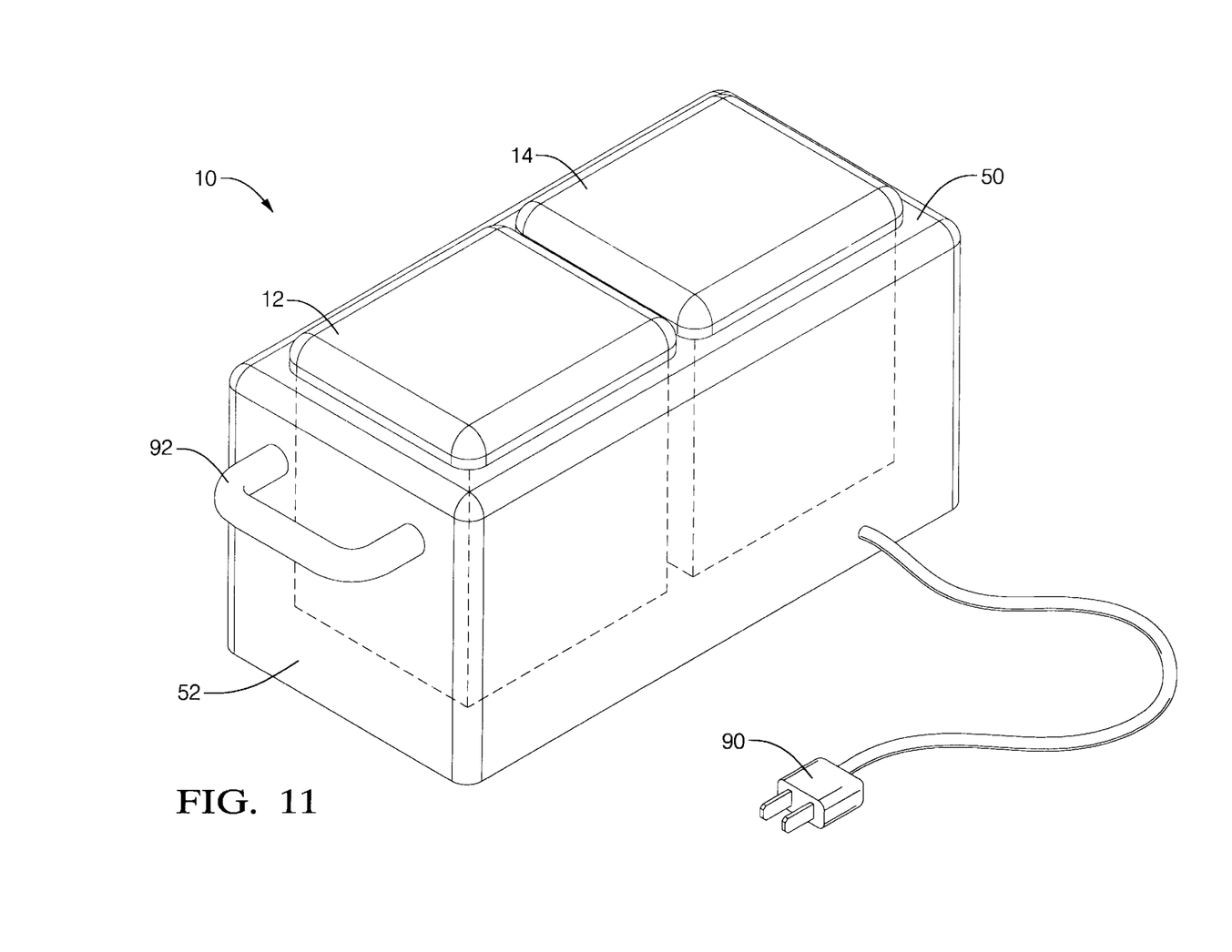
FIG. 11 is a perspective view of the heated/cooled console storage unit of FIG. 1 in another embodiment of the present invention.

In yet another embodiment of the present invention, as shown in FIG. 11, heated/cooled storage unit 10 is a portable, stand-alone unit which may be selectively placed within or without the vehicle. In this embodiment, the storage unit includes a power adapter 90 through which electrical power is supplied to thermoelectric module 16. The power adapter may be mated with an outlet in a vehicle, such as an outlet typically used with a cigarette lighter. In this embodiment of the storage unit, casing 52 serves as an outer shell. Casing 52 may include at least one grip member 92 to promote the portability of the storage unit 10. The heated/cooled storage unit of this exemplary embodiment may be placed within the vehicle as desired to provide a heated and a cooled compartment therein for selective storage of various items including food and/or beverages.

The present invention generally provides an integrally located, highly efficient, thermally controlled vehicle compartment system which serves to provide both heated and cooled storage simultaneously while not consuming substantial space within a vehicle occupant compartment. Food and/or beverage items may be securely stowed within either of the compartments depending upon the desired temperature of the items sought to be maintained. In this way, the palatability of the items may be maintained and the possibility of spillage negated.

Although heated/cooled storage unit 10 of the present invention has been described herein as incorporating thermoelectric temperature controls, it is conceivable and within the reach of the instant application, that storage unit 10 utilize other mechanisms of temperature control such as, for example, purely electrical systems or compressor/gas based systems, etc.

Accordingly, while preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A storage unit for use in an interior compartment of a vehicle, comprising:
   a first storage compartment;
   a second storage compartment; and
   a thermoelectric module being configured and dimensioned for securement in between said first and second storage compartments, said thermoelectric module heating said first compartment and cooling said second compartment, said first storage compartment and said second storage compartment each including an interior formed therein, said compartments each further including an opening through which to access said interior and a cover member disposed at said opening selectively providing access to said interior of the respective compartment.

2. The storage unit as in claim 1 wherein said cover member is hingably attached to said compartment, said storage unit further including a sealing element disposed between said cover member and said compartment such that a thermal seal is selectively formed between said cover member and said compartment.

3. The storage unit as in claim 1 wherein said cover member includes an insulation layer formed atop a substrate, a padded formed atop said insulation layer and a surface skin formed atop said padded layer.

4. The storage unit as in claim 1 further comprising an insulation layer disposed about said first and second storage compartments.

5. The storage unit as in claim 1 further comprising a casing disposed about said first and second compartments for containing said compartments therein.

6. The storage unit as in claim 1 further comprising an adapter for connecting to a power source within said vehicle, said storage unit capable of being selectively removed from said vehicle.

7. The storage unit as in claim 1, wherein said second compartment includes a cold plate located therein, said cold plate being made of a thermally conductive material.

8. The cold plate as in claim 7, wherein said cold plate is L-shaped, said cold plate being located proximate to two interior surfaces of said second compartment.

9. A storage unit for use in an interior compartment of a vehicle, comprising:
   a first storage compartment;
   a second storage compartment; and
   a thermoelectric module being configured and dimensioned for securement in between said first and second storage compartments, said thermoelectric module heating said first compartment and cooling said second compartment, said thermoelectric module including a heat distribution element located in said first compartment and a heat absorbing element located in said second compartment, wherein said heat distribution element and said heat absorbing element are connected therebetween by a conductive element.

10. The storage unit as in claim 9 wherein said heat distribution unit includes a heat sink disposed connectively with said conductive element, said heat sink having fins for distribution of heat, said heat distribution unit further including a fan mechanism for circulating air within said compartment, said fan mechanism being disposed adjacent to said heat sink, wherein a cover member is disposed about said heat sink and said fan mechanism.

11. The storage unit as in claim 9 wherein said heat absorbing element comprises a thermally conductive element connected to said conductive element.

12. The storage unit as in claim 11 wherein said thermally conductive element is L-shaped and is disposed adjacent to a first side and a second side of an interior of said second compartment such that an item placed in said interior contacts said thermally conductive element.

13. The storage unit as in claim 9, wherein said second compartment includes a cold plate located therein, said cold plate made of a thermally conductive material.

14. The cold plate as in claim 13, wherein said cold plate is L-shaped, said cold plate being located proximate to two interior surfaces of said second compartment.

15. A storage unit for use in an interior compartment of a vehicle, comprising:
   a first storage compartment;
   a second storage compartment; and a thermoelectric module being configured and dimensioned for securement in between said first and second storage compartments, said thermoelectric module heating said first compartment and cooling said second compartment, said first storage compartment including a first interior formed therein and said second storage compartment including a second interior formed therein, said first interior being 130 inches$^3$ and said second interior being 260 inches$^3$.

16. A storage unit for use in an interior compartment of a vehicle, comprising:

a first storage compartment;

a second storage compartment; and a thermoelectric module being configured and dimensioned for securement in between said first and second storage compartments, said thermoelectric module heating said first compartment and cooling said second compartment, said storage unit being integrally located within an occupant compartment of said vehicle.

17. The storage unit as in claim 16 wherein said storage unit is integrally located within a center console of said occupant compartment.

18. A storage unit for use in an interior compartment of a vehicle, comprising:

a first storage compartment;

a second storage compartment; and a thermoelectric module being configured and dimensioned for securement in between said first and second storage compartments, said thermoelectric module heating said first compartment and cooling said second compartment, said storage unit further comprising a controller for operating said thermoelectric module and selectively providing a power supply thereto, said controller including a thermostat mechanism for monitoring and maintaining desired temperatures within said first storage compartment and said second storage compartment, said controller further including a timing mechanism for disabling said power supply at a predetermined time after disengagement of an engine of said vehicle.

19. A storage unit for use in an interior compartment of a vehicle, comprising:

a first storage compartment;

a second storage compartment; and a thermoelectric module being configured and dimensioned for securement in between said first and second storage compartments, said thermoelectric module heating said first compartment and cooling said second compartment, said storage unit further comprising a controller for operating said thermoelectric module and selectively providing a power supply thereto, said controller further including a control mechanism for allowing an operator to operate said thermoelectric module, providing said power supply thereto and adjusting said temperature thereof.

20. A method of storing items within a motor vehicle comprising:

a) providing a first storage compartment;

b) providing a second storage compartment adjacent to said first storage compartment;

c) providing a thermoelectric module being configured and dimensioned for securement in between said first and second storage compartments;

d) providing a first temperature to an interior of said first storage compartment using said thermoelectric module;

e) providing a second temperature to an interior of said second storage compartment using said thermoelectric module; and f) placing items within said first and second storage compartments.

* * * * *